(12) United States Patent
Fridental et al.

(10) Patent No.: US 10,565,455 B2
(45) Date of Patent: Feb. 18, 2020

(54) METHODS AND SYSTEMS FOR AUDIOVISUAL COMMUNICATION

(71) Applicant: ANTS TECHNOLOGY (HK) LIMITED, Wanchai (HK)

(72) Inventors: Ron Fridental, Shoham (IL); Ilya Blayvas, Jerusalem (IL); Lili Zhao, Beijing (CN)

(73) Assignee: ANTS TECHNOLOGY (HK) LIMITED, Wanchai (HK)

( * ) Notice: Subject to any disclaimer, the term of this patent is extended or adjusted under 35 U.S.C. 154(b) by 355 days.

(21) Appl. No.: 14/809,218

(22) Filed: Jul. 26, 2015

(65) Prior Publication Data

US 2016/0321506 A1 Nov. 3, 2016

Related U.S. Application Data

(60) Provisional application No. 62/154,928, filed on Apr. 30, 2015.

(51) Int. Cl.
| | |
|---|---|
| *G06K 9/00* | (2006.01) |
| *H04N 7/18* | (2006.01) |
| *H04N 21/439* | (2011.01) |
| *H04N 21/4788* | (2011.01) |
| *H04N 21/44* | (2011.01) |

(52) U.S. Cl.
CPC ..... *G06K 9/00771* (2013.01); *G06K 9/00335* (2013.01); *G06K 9/00718* (2013.01); *G06K 9/00751* (2013.01); *H04N 7/181* (2013.01); *H04N 21/4394* (2013.01); *H04N 21/44008* (2013.01); *H04N 21/4788* (2013.01); *G06K 2009/00738* (2013.01);

(Continued)

(58) Field of Classification Search
CPC ........ G06F 3/0484; G06F 3/017; G06F 3/167; G06K 2009/00738; G06K 9/00335; G06K 9/00718; G06K 9/00751; G06K 9/00771; H04M 3/56; H04N 21/4394; H04N 21/44008; H04N 21/4788; H04N 7/18; H04N 7/181

See application file for complete search history.

(56) References Cited

U.S. PATENT DOCUMENTS

| | | | |
|---|---|---|---|
| 8,700,392 B1 * | 4/2014 | Hart ........................ | G10L 15/25 704/231 |
| 2005/0195079 A1 * | 9/2005 | Cohen .................... | G08B 25/10 340/539.12 |

(Continued)

*Primary Examiner* — Gelek W Topgyal
(74) *Attorney, Agent, or Firm* — Soroker Agmon Nordman (57) ABSTRACT

Disclosed are systems and devices for facilitating audiovisual communication. According to embodiments, there may be provided a communication device including or otherwise functionally associated with a video camera to acquire visual information from a scene and to convert the visual information into a video stream. A video processing circuit may (a) receive the video stream, (b) extract user related features from the video stream; and (c) detect and characterize one or more user actions. A controller to receive the video processing circuit output and responsive to an indication of one or more detected events within the video stream to trigger a communication session between said communication device and an addressee device, wherein different addressee devices may be associated with different detected actions.

21 Claims, 6 Drawing Sheets

(52) U.S. Cl.
CPC .... *H04M 2201/50* (2013.01); *H04M 2242/04* (2013.01); *H04M 2242/30* (2013.01)

(56) References Cited

U.S. PATENT DOCUMENTS

| | | | | |
|---|---|---|---|---|
| 2006/0227237 | A1* | 10/2006 | Kienzle | G08B 13/194 348/343 |
| 2007/0057912 | A1* | 3/2007 | Romriell | G06F 3/017 345/156 |
| 2008/0084473 | A1* | 4/2008 | Romanowich | G08B 13/19671 348/135 |
| 2009/0079813 | A1* | 3/2009 | Hildreth | H04N 7/147 348/14.03 |
| 2009/0191850 | A1* | 7/2009 | Cardwell, III | G08B 25/016 455/412.2 |
| 2009/0225750 | A1* | 9/2009 | Hawkins | H04L 12/66 370/353 |
| 2009/0290811 | A1* | 11/2009 | Imai | G06T 3/4061 382/285 |
| 2009/0327977 | A1* | 12/2009 | Bachfischer | B60K 35/00 715/863 |
| 2010/0232589 | A1* | 9/2010 | Vernick | G06Q 30/02 379/216.01 |
| 2012/0002791 | A1* | 1/2012 | Kraus | A61B 5/0022 379/37 |
| 2012/0133580 | A1* | 5/2012 | Kirby | G06F 3/017 345/156 |
| 2013/0004016 | A1* | 1/2013 | Karakotsios | G06K 9/00355 382/103 |
| 2013/0100268 | A1* | 4/2013 | Mihailidis | G08B 21/02 348/77 |
| 2013/0212606 | A1* | 8/2013 | Kannan | H04N 21/4667 725/12 |
| 2014/0031001 | A1* | 1/2014 | Jacobsen | H04W 4/22 455/404.2 |
| 2014/0146171 | A1* | 5/2014 | Brady | H04N 7/188 348/143 |
| 2014/0187225 | A1* | 7/2014 | Miller | H04L 12/1818 455/418 |
| 2014/0267009 | A1* | 9/2014 | DeLean | G06F 3/017 345/156 |
| 2014/0267543 | A1* | 9/2014 | Kerger | H04W 4/21 348/14.02 |
| 2015/0074532 | A1* | 3/2015 | Lapidot | G06F 3/017 715/719 |
| 2016/0187992 | A1* | 6/2016 | Yamamoto | G06F 3/017 345/156 |

* cited by examiner

METHODS AND SYSTEMS FOR AUDIOVISUAL COMMUNICATION

PRIORITY CLAIMS

This application claims priority from: U.S. Provisional Patent Application No. 62/154,928, titled "Novel Method and System for Remote Audiovisual Communication", filed by the inventors of the present invention on Apr. 30, 2015, which is hereby incorporated into the present description in its entirety

REFERENCES CITED

US Patents

| | | | | |
|---|---|---|---|---|
| [A1] | 8,754,763 B2 | June 2014 | Morehead | 340/501 |
| [A2] | 8,472,613 B1 | June 2014 | Pan et.al. | 379/355.06 |
| [A3] | 7,315,736 | January 2008 | Jenkins et.al. | 455/404.1 |
| [A4] | 6,886,008 B2 | March 2001 | Blayvas et.al. | 707/3; G06F 17/30 |

Other Publications [C1] SIDS and Other Sleep-Related Infant Deaths; PEDIATRICS Vol. 128 No. 5 Nov. 1, 2011; pp. e1341-e1367

BACKGROUND

The invention is generally related to the field of digital video cameras. More specifically, this invention is related to methods and systems for audiovisual communication.

Advances in digital imaging technology have led to the widespread use of digital video cameras, and in particular surveillance security cameras. These cameras are installed in numerous and a rapidly growing number of locations, including public places, companies, and private houses and used for real-time and delayed monitoring of spaces/areas imaged by the cameras. In the prior art systems the surveillance camera role is usually limited to passive monitoring and recording.

There are multiple events and situations observed by the surveillance cameras that require immediate response, assistance or at least notification of some corresponding persons, and which often remain unwatched and unattained at the time of the event. Such events include, but are not limited to: security events, crime and violence, accidents, medical emergencies, lost children etc.

In the vast majority of situations, when the crime, accident, mishap or tragedy can be prevented or mitigated by a timely response, it is only detected, if ever, after thorough and effort consuming post-factum investigation and search within the recorded videos.

SUMMARY

In this disclosure we describe the novel systems and methods of interactive video surveillance for the benefit of their owners and society. The disclosed systems are capable of recognizing certain situations, and promptly notifying the relevant addressees by sending appropriate messages or establishing communication channels.

Furthermore, society enjoys the widespread use and growth of telecommunications, with the growing amount of video messages and video communication. However in the prior art scenarios the smartphones or computers are needed to establish the telecommunication. Advances in video processing hardware and algorithms, as well as the spread of video cameras connected to the data network, will allow implementation of the novel communication methods, where the call is initiated by a voice or gesture command given to the camera by a user within its field of view, or by the system itself, upon detection of a pre-defined triggering situation or event from analysis of the video stream.

As a response to the user command or triggering event, a camera may determine the addressee, and the required response. The required response may be to send a descriptive text message, a video summary message or to establish a full audio or video communication between the user within its surveillance field and an addressee.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:.

It will be appreciated that for simplicity and clarity of illustration, elements shown in the figures have not necessarily been drawn to scale. For example, the dimensions of some of the elements may be exaggerated relative to other elements for clarity.

It should be understood that the accompanying drawings are presented solely to elucidate the following detailed description, are therefore, exemplary in nature and do not include all the possible permutations of the present invention.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing", "computing", "calculating", "determining", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer selectively activated or reconfigured by a computer program stored in the computer. Such a computer program may be stored in a computer readable storage medium, such as, but is not limited to, any type of permanent memory including solid state drives and flash memory, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

Below we disclose several scenarios, and the desired system responses, and then disclose the structure and functionality of the system that enables said scenarios and responses.

All the scenarios described here serve as non-limiting examples, which can be altered and extended via system configuration and programming. There are many other scenarios of use of the disclosed system, which exhaustive description would be unpractically long, however they should be obvious to a person sufficiently skilled in the art. In other words, it should be understood that the following examples are presented to explain and demonstrate the principles of the present invention and, therefore, are merely representative of the many possible scenarios in which the present invention may be implemented.

The term "call", "calls", "produces the call", "performs a call", "established the call" and similar terms are used in the most generic sense of performing notification or establishing communication. It can mean notification of any kind, including but not limited to sending a text message, video message, image, or any other kind of information or data etc. Sending towards the telephone messaging system, e-mail, any messaging program, establishing a telephone audio, video or combined call towards the telephone or any communication program, or any other program and system which can accept such message for storage, processing or further relaying, etc.

The information can be relayed over a telephone network, a computer data network, the Internet and/or any other data network or infrastructure supporting such communication.

The term "addressee" refers to the party receiving the call. It can be a specific human, a specific phone number, a program, device, computer system—i.e. any human being or data system that are the intended destination of the call/communication.

The term user usually means the person initiating the action of the system, and usually it is the person within the surveillance field of the video camera. Depending on context, however, the user can also be the person initiating the call from a conventional telephone or computer, towards a surveillance system.

As a first exemplary scenario, consider a child playing in his living room, equipped with surveillance system. The child just made a new drawing and wants to show it to his mother, who is currently away. He is too young and unable to use the phone, however he turns towards the camera, waving the drawing in his hands and saying "Mama, look at my drawing!". The system recognizes the command (perform the video call), the addressee (the child's mother) and establishes the video call towards her. The video call may be relayed towards the mother's phone, computer, or any other device in her possession enabling the communication. According to further embodiments, audio and video from the mother may be relayed back to the child via the speaker and display of the camera system, or any other appropriate nearby speaker and display.

The information correlating the user to his specific addressee may be acquired by any one of a multitude of manners. For example, it may be programmed into the configuration file, set into a specific address book for each particular user, acquired from an address book of each particular user, from his telephone, e-mail addresses, list of links, addresses, phone-numbers, friends etc. of communication and social programs that he uses and so on.

The specific addressees may also be learned by processing and analyzing of acquired video including social interactions of the given user. For example, in a big family house, where many persons of the extended family of several generations and several multiple siblings within each generation are living or occasionally visit the house, a particular child, called Anna, usually regards a particular woman, Jenifer, as "mama". Another child, called Sam, regards a certain man, called Daniel as "Grand Pa". Later on, when Anna says "call Mama" the system will produce a call towards Jenifer, while when Sam says "show this to Grand Father" the system may produce a video message and send it to Daniel. In other words, the system may be programmed to learn of interrelations between subjects appearing in video based on analysis of the video. In another example, if Mark regularly refers to Abraham and "Dad" the system may learn that Abraham is his father. Similarly, if Abraham regularly refers to Samantha as "Mom", the system may learn that Samantha is Abraham's mother. According to yet further embodiments, the system may also be adapted to deduce from the above facts that Samantha is Mark's grandmother.

In another example scenario, an elderly or disabled person may want to call for paramedics in the case of a medical emergency. The person's speech may be slurred and/or otherwise impeded due to their medical condition. Murmured speech, speech at a relatively lower volumes and speech clarity are examples of speech characteristics indicating a potential medical emergency and may be detected by a voice analysis system according to embodiments of the present invention. Although the person may be unable to use the phone, the person's medical emergency situation may be recognized by the system and the appropriate message sent and/or an audio/video call towards the appropriate addressee may be performed.

Furthermore, after an emergency condition is flagged due to detection of abnormality in a subject's motion, position, time delays, speeds etc., slurred and/or murmured speech, speech at lower than usual volumes, speech clarity, the message generated by the system may include indications of the medical condition by appending portions of video of the subject into a video summary or synopsis. By parsing and analyzing previously recorded video, relevant abnormal scenes which were originally assessed as being below the trigger threshold, but were still detected as abnormal, can be included into the summarizing message.

The pre-defined emergency addressee may be a generic 911 service, a particular person or company caring for him, a close relative, defined explicitly or deduced by the system from video analysis, any other relevant party and/or a combination of the above. The summarizing message, including addressee and describing the situation, with possible summary video, may be sent or made available for retrieval and review. The content of the summarizing video may depend on the triggering event. In the case of a medical emergency, for example, it may include the same moments and scenes that contributed to the trigger decision, as well as some temporally and situationally adjacent/relevant moments and scenes.

The medical emergency situation can be detected by analyzing the video and/or from data from other sensors, such as audio, 3D, heart rate sensor etc. The clues for a medical emergency event can be the collapse of the person, especially in the abnormal poses and locations (collapse onto the floor in any area will be distinguished from lying down onto the bed), motionless or abnormal motions, abnormal breath, heartrate, body positions, sounds etc.

Note that the triggering event may require exceeding a particular threshold in the abnormality of motion, positions, time delays, speeds etc. Slurred and murmured speech, speech at lower volume and clarity are example of the features indicating potential medical emergency and detected by voice analysis system. After the medical emergency has been detected, however, the describing message may be composed by also parsing and analyzing previously recorded video. Previous relevant abnormal scenes, which were originally below the trigger threshold, may also be included into the summarizing message.

Similarly, in a child and/or infant monitoring situation, a medical emergency situation, and all subsequent actions (i.e. generating an alarm call), may also be defined as absence or abnormal breathing, as well as dangerous sleeping positions, such as face down sleeping and other sleeping obscuring the breath. More specific details regarding the analysis and signs of emergency are discussed in [C1], which is incorporated herein by reference.

Another example scenario is pet monitoring. A pet wandering in an area of its feeder can generate a message to its owner, indicating that he is hungry. In more advanced smart-home scenarios, an appropriate command can be sent to an automatic feeder. If a pet enters a forbidden area, such as the kitchen, or performs a prohibited behavior (e.g. steals the food from the table), a notifying message, and possibly a video summary can be sent to the owner.

As an example scenario, consider a cat or a dog that enter the forbidden kitchen area and steal the food from the table or from the fridge. In this case, an automatic call and creation of video channel towards the owner may be performed. An audio channel from the owner may also be opened, so that the owner can shout or otherwise act to stop the pet.

In another embodiment, the recording of an appropriate voice order from the owner is automatically played to the pet, based on the trigger event.

In another example, a surveillance system installed in a store monitors customers for theft prevention, and notifies the supervisor when a customer enters a restricted area, or takes away goods without paying. The system surveillance system installed in the shop area tracks the products that were taken from the shelves. Any particular product, that was not placed into the shopping basket (but was rather hidden by the customer into the pocket or under the clothes) produces the trigger, a corresponding video summary of the event (how the product was taken and hidden) may be produced and sent to the appropriate supervisor/party. For a polite and relaxed solution of the situation, the customer may be "reminded" at the cashier machine or the exit of the shop if he rather wants to pay for that particular item, or leave it at the store.

Other technically similar scenarios include triggering an event when a child/infant leaves a specific room or defined area, or enters a prohibited area. The system can be configured to prevent children from self-endangering behavior, such as climbing towards the windows, or high furniture; leaving the child room towards the stair cases, playing with fire etc. In case of a trigger event from that list, or another relevant trigger event, the child's supervisor may be notified, relevant emergency calls made (e.g. fire dept.), alarms activated, automatic remedial/preventive action taken (e.g. cutting relevant electric circuits), and/or any other appropriate response generated.

In some particular high security environments, such as sensitive bank facilities, or military facilities, certain personnel may not be authorized to leave or enter certain areas. Therefore, upon their entrance or leaving, respectively, of the specified areas the supervisors may be notified, relevant emergency calls made, alarms activated, automatic remedial/preventive action taken (e.g. automatically locking certain facilities), and/or any other appropriate response generated.

Another necessity tackled by the present invention is sending the automatically created summary videos. The summary video message may be sent at a pre-defined time, or upon a trigger event. In the first case, the video summarizing the essential moments of the pre-defined period is sent towards a pre-defined addressee. In the second case, the video message may contain a summary of the triggering event, and it may be sent to one or more addressees determined in accordance to system configuration and the triggering event.

The summary video may be prepared and sent to a user. The moments for the summary video may be prepared from scenes and moments automatically selected and compressed, via video analyzing, by selecting the moments with detected motion, scene change, statistically untypical moments, alternatively the moments that were selected by request of the user in the camera vicinity, as respond to the commands like "record this", "make a shoot" or trigger events, derived from analysis of events observed in the scene, and user speech and behavior.

As one example, consider the camera placed in the child room that produces a day summary of the most interesting events in the life of the child or the children. The trigger parameter for the most interesting events may be various clues indicating the peak of child's activity and excitement. Number and identities of the participants, speed of motion, level of sound in the room, level of heartrate breadth, direction of sight, action, body position, motion of arms, or explicit orders like "show this to mama, call nanny, record this"—all can serve as clues of particularly interesting situations.

The faster motions, jumps, running, or on the contrary—concentrating attention during the activity like drawing, toy assembling or playing can serve as the clues and features for evaluating the importance of the particular event. Additional participants such as other children, and pets can serve as another type of clue. Video processing techniques, extracting the heartrate and breadth rate and strength can help to extract additional measures of excitement. One of the ways to extract the heartrate and breadth rate and magnitude is based on amplifying the differences in color and position of adjacent frames in the video sequence.

Therefore the video summary of day activity in the child room may include one or more of: playing with the pet, selected due to participants (children and pets), activity (that play will probably be active, with increased motion speed, breadth, heartrate and sound level—for example due to shouts and barking); play with the neighbor children—due to participants, drawing—due to attention concentration, detected by motoric activity and sight tracing of the drawing child, and finally a detailed shoot of the drawing itself—due to direct order "show this to parents", when the child was waving the drawing in front of the camera.

As another example, consider the medical emergency situation. The strongest clue for medical emergency may be collapse and motionless body position, especially outside a normal resting area, such as a bed or a sofa. Many additional clues may be factored: breathing patterns, prolonged leaning on something, coughing, hands touching the chest or stomach, etc. Each clue and/or their combination may need to pass a certain threshold to cause an alarm (trigger an event). For example a short leaning onto the wall in the bathroom for a couple of seconds, or single coughing will normally not activate the trigger. However, after the trigger threshold was surpassed, all the previous alarming moments with alarming clues may be added to the summarizing video, even for the cases when the clues did not pass the threshold level as they occurred, or the threshold level may be retroactively lowered and reexamined Examples of threshold parameters can be: time and intensity of coughing, time of lying on the floor or leaning against the wall, abnormally low or abnormally high intensity of the breathing, with the level and duration of abnormality as the parameter.

Generalizing, the surveillance system may analyze the video stream and streams from other sensors, such as audio, 3D, looking for the potential triggering situation. Triggering situation may also be an explicit user command, medical emergency, violation of defined area, behavior rules set to pets, area rules implied to people, endangering poses defined for infants, elderly or disabled patients; situations of trespassing, violence, accidents like fire, etc.

Upon detecting the triggering situation, the system may determine the appropriate addressee(s). The addressee(s) may be situation dependent, for example in the case of medical emergency it may be paramedics service, in the case of fire—a fire department; addressee(s) can be user-specific, for example the command "call mother" may result in a call to a particular mother of this particular person. Selection of addressee(s) may depend on system configuration, address book of the particular user giving a call command etc.

The system response to the trigger situation might be one of the several choices: Notifying the addressee(s) by: corresponding text message, a summary video message, and/or establishing a communication channel. The established communication channel may be audio and/or video, one-directional or two directional. The communication channel and messages can may be delivered over telephone or data network, and, further, may be enabled at the addressee(s)' side, over his telephone, smartphone, computer, tablet computer or any other portal facilitating audio and/or video communication.

Consider the following exemplary scenarios, with different system response. Pet monitoring, where the pet enters the forbidden space, such as the kitchen, and steals food from the table or refrigerator, the system may establish asymmetric communication, where the video is transmitted from the camera observing the pet towards the owner, and the audio—from the owner towards the pet.

In the case of intrusion detection, the video from the cameras may be transmitted to the owner, and nothing transmitted back from the owner towards the apartment. The notifying text or video summary message may be an alternative option.

In the case of the child initiating the call towards his mother, a bi-directional audio and video communication channel may be established.

In the case of medical emergency—a video summary message may be sent along with the text notification towards the corresponding supervisor or medical emergency service.

In some embodiments of the disclosed invention, a distributed system, comprised of several surveillance systems installed in the same or different households may be used. Consider an example of a large and friendly family of many couples from two or more generations, living in different households. Children often visit their cousins in different households, brothers and sisters may search for each other and wish to communicate while staying in different houses. A simple order "Call Jim" said by Jack, whose most frequent communication is with his brother Jim, may cause the system to find Jim, by requesting the cooperating systems installed in the entrusted households of the extended family, detect the particular location where the Jim is currently located, and establish the communication channel with him Obviously, the above example is not limited to a particular case of several households of the extended family, but rather to any number of cameras, connected to a network and capable of information exchange.

The drawings described below are provided for further illustration and clarification of system architecture and operation.

Figure 1:
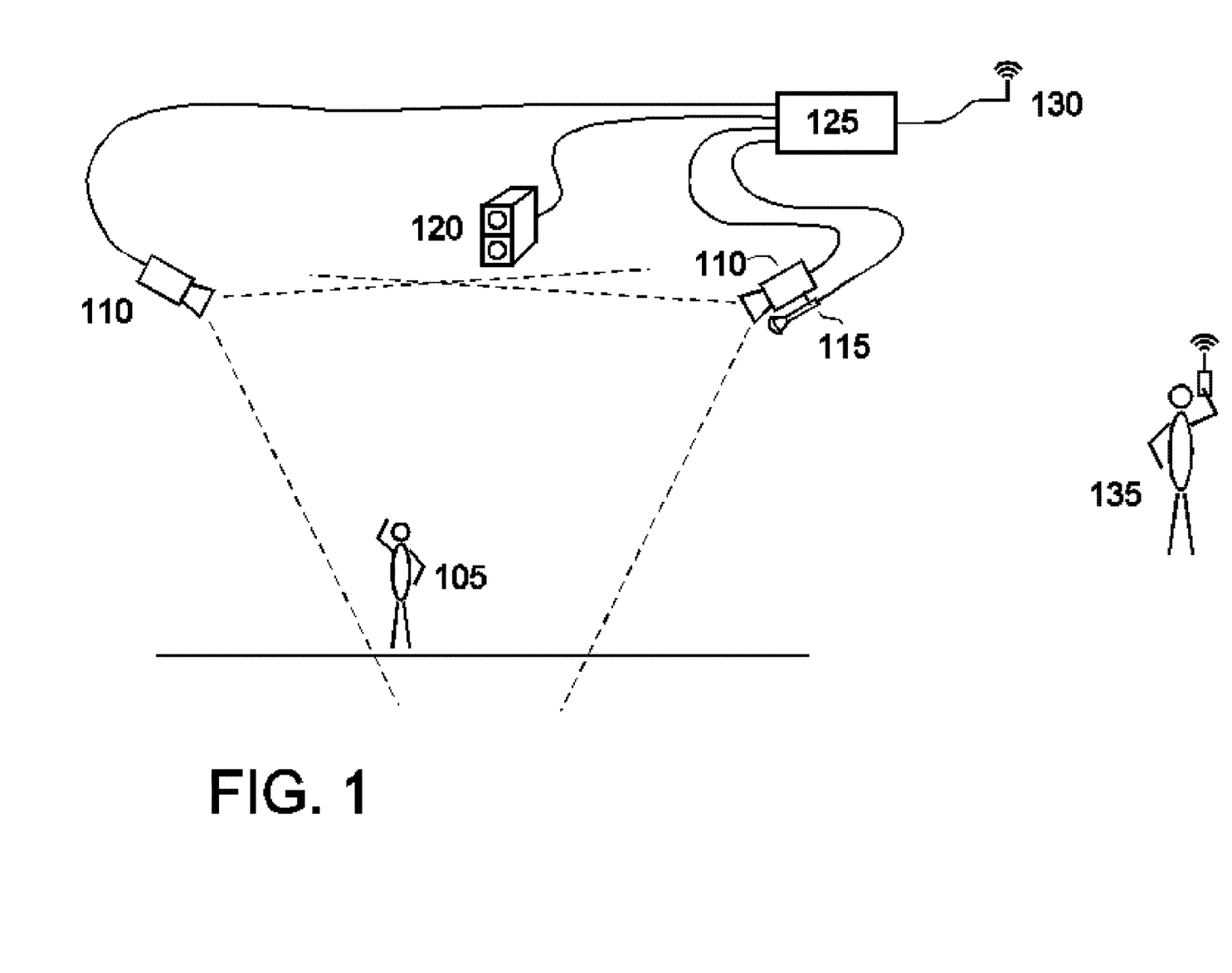
FIG. 1 is a schematic drawing of an exemplary embodiment of the disclosed system.

FIG. 1 schematically illustrates some embodiments of the disclosed system. The specific details may vary for different implementations, use scenario, hardware and software configurations.

110 represents one or more video cameras, optionally coupled with other sensors such as audio 115 and 3D scanners 120; video analytics software 125, which may be embodied within the camera, within the surveillance system, or situated on a remote processing unit/server. Upon detection of a triggering event, a target addressee for that event 135 may be determined and notified.

Figure 2:
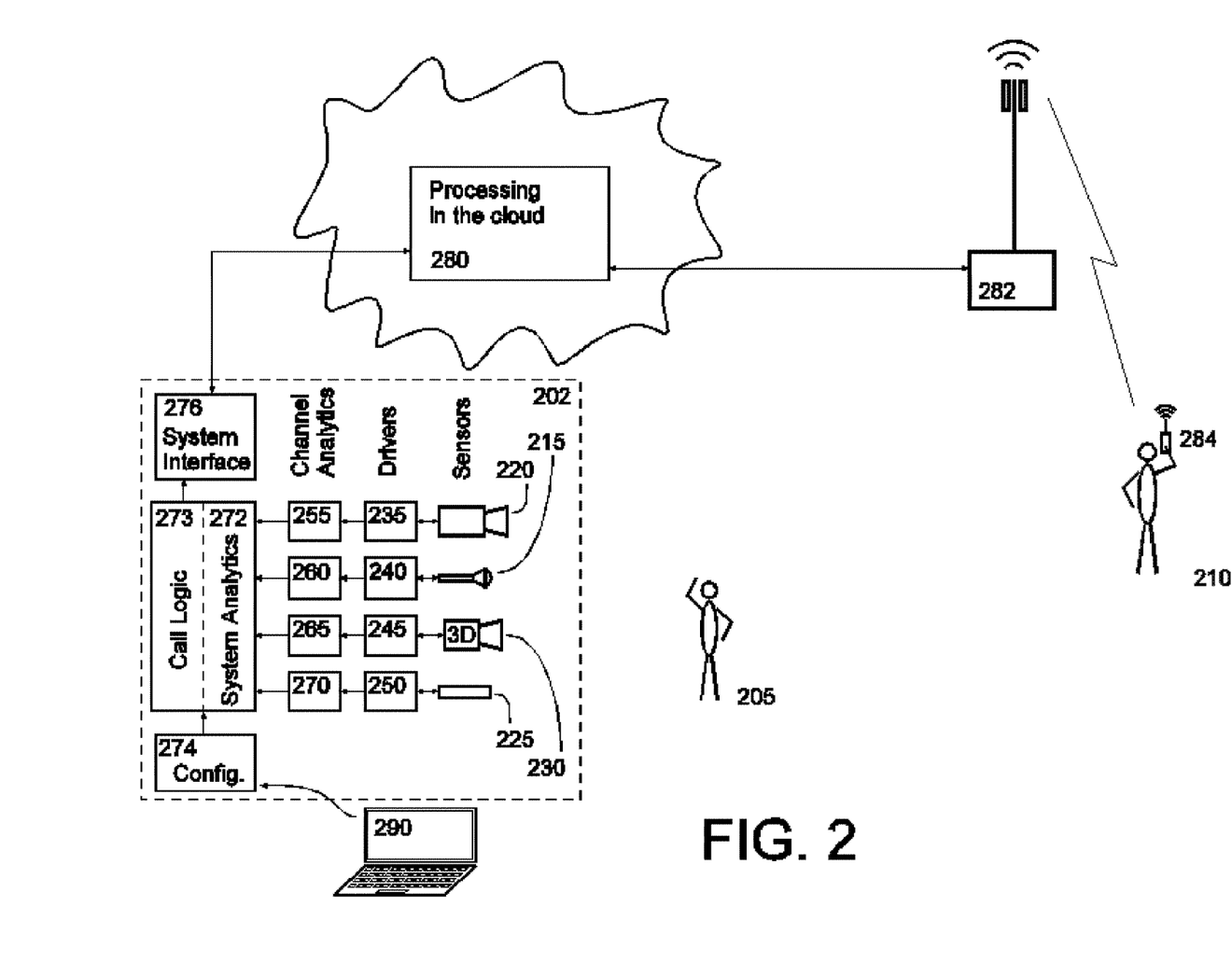
FIG. 2 is a block diagram illustrating the basic blocks of an exemplary surveillance/imaging system, according to some embodiments of the present invention.

FIG. 2 illustrates a block diagram of some embodiments in more detail. 220 represents the video camera(s), 240—microphone, 245 3D scanner, 250 denote other optional sensors or inputs, which may include additional cameras, microphones, 3D scanners, and/or infra-red cameras, biometric sensors etc. The set, type and number of inputs may vary depending on implementation and configuration, although we generally assume presence of at least one video camera. 235, 240, 245, 250 denote the hardware and algorithms of sensor drivers, as well as basic low-level signal processing. For example the camera driver 235 may provide proper adjustment of exposure, focus, white balance, denoising and other basic properties of the camera 220 necessary to obtain the decent video for the further processing and analyzing in the system. 3D scanner driver 245 may be responsible for operating the 3D scanner 230, and obtaining the temporal sequence of 3D scans of the scene for further analysis and processing.

255, 260, 265 and 270 denote the processing blocks where the signals from the sensor are processed. For example the video analytics block 255 may process the video stream from camera 220, and perform operations such as face recognition and identification, object tracking, gesture recognition, etc. The voice recognition block 260 may perform the analysis and recognition of the voice measured by the microphone 215. The 3D analytics block 265 may process the 3D information obtained from 3D scanner 230, and perform, among the other 3D analysis operations, pose estimation, gesture recognition, location calculation, location rule verification etc.

Block 272 denotes hardware and software for analytics of the inputs on the system level. It may be the block 272, where the triggering situations are detected and verified on the basis of combined results from analytics of separate sensor channels, obtained in blocks 255, 260, 265, 270. Some of the computations may be performed on the remote server 280.

The definition of specific triggering situations, addressee(s), rules, types and formats of calls or messages may be defined in the system configuration file 274. The configuration file may be defined for specific system implementations, and may be modifiable, for example with the help of computer 290.

Block 273 combines the call logic computations and support. This includes determining of addressee(s), creation of optional text or video messages, forming the data stream and other call supporting operations.

276 denotes the system interface, which may select and compress the appropriate data and transmit it towards the remote server or servers 280. The server can be a specific dedicated server or servers, distributed processing service "in the cloud", or any other appropriate way of further processing beyond the system 202.

Some of the operations, such as data storage, video and audio analysis and other computationally demanding operations can be performed on the external computer 280 beyond the system 202. This computer can be remote server on the network, distributed processing and storage "in the cloud" or any other appropriate solution known in the art that supports enhanced computations and connectivity.

282 denotes one of the ways to relay communication via the base station 282 towards the communication device 284 of the addressee(s) 210. Any communication technology known today or to be devised in the future may be implemented to contact an addressee in accordance with the principles described herein.

The call between user 205 and addressee(s) 210 can be initiated by user 205, addressee(s) 210, or the system 202 detecting a triggering event. The call may be a text or vide summary message, audio and/or video call.

Authorized addressee(s) (user) 210 (for that particular scenario 210 is actually a user, and will be referred as here as user) can initiate a call to monitor a system, or query a video summary from a particular camera or cameras, time interval or event, he can review and change the system configuration file to program the system for detection of novel events or novel responses.

Figure 3:
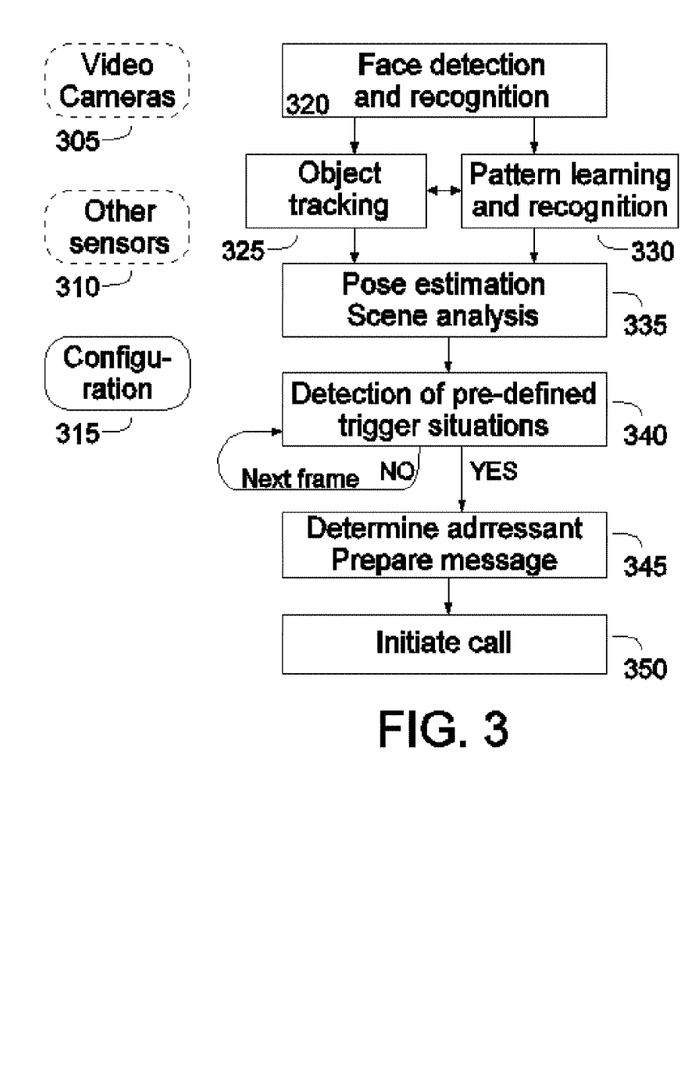
FIG. 3 is a flow chart including steps of operation of an exemplary surveillance/imaging system, according to some embodiments of the present invention.

FIG. 3 is a flow chart illustrating exemplary operation of video analytics software. 305 denote one or more video cameras that provide video stream for the system. 310 are optional other sensors, such as 3D scanners, microphones or any other relevant sensing, detection or measurement input. 315 denotes configuration of the system.

The system configuration can include definition of specific trigger events, including specific people, situations, places, times, definition of target addressee(s) and form of message or call for that event. For example the children playing and lying on the carpet can be an ordinary situation, while an elderly person lying on the floor might be configured as a medical emergency and might generate an emergency call to paramedics. Entrance of family members or children's friends might be configured as normal, while entrance of strangers or specific persons from 'alarm list' might generate a notifying call pre-defined person. Similarly the fire detected in the fireplace will be a normal situation, while a fire detected in other locations may generate a call to the fire department.

Blocks 320, 325, 330, 335, 340 represent modules of video analytics, which may comprise face detection and recognition 320, object tracking 325, pattern learning and recognition 330, pose estimation and scene analysis 332, and/or a trigger-detection block 340, which may analyze the results obtained in blocks 320-335, and information provided by optional auxiliary sensors 310, and on the basis of settings and definitions from configuration 315 detect the call-triggering situations.

If a triggering situation was detected, the relevant addressee(s) may be determined in block 345, based on the situation and on the configuration 315 as well as the type of communication. The message is prepared, if necessary. It can be a text message, describing an event, a recorded video of an event, and/or an automatically prepared recorded video. It can be an establishment of one way or two ways communication channel, audio, video or combined. The prepared video sequence may be compressed by cutting out static, irrelevant or non-informative sections, or otherwise modified in any appropriate way.

The call may be initiated in block 350. The call may be performed by multiple ways, using telephone network or computer network connection. The call may be directed to an addressee(s)' telephone, computer or other device enabling communication.

Configuration file 315 may include a list of monitored scenarios, such as fire, security emergency including the generic intruders, home violence and/or a list of specific people, times and events to be monitored. It may also include lists of appropriate target addressee(s) for each event and preferred communication method and/or details.

Several different connectivity and data options of alerting an addressee are possible. The calls may be by phone network, or computer network. The phone calls may be facilitated by the computer server, or by local phone via pre-installed software and Wi-Fi/Bluetooth communication with surveillance system. The calls can be directed to the human users or to the other systems, such as automatic fire extinguishing, moving cameras or drones for further monitoring. The alerting call may be a text message, summarizing the event, or establishment of the audio, video, or combined channel, one or two directional. The video can be a real time video, or compressed and automatically created descriptive video sequence.

Figure 4:
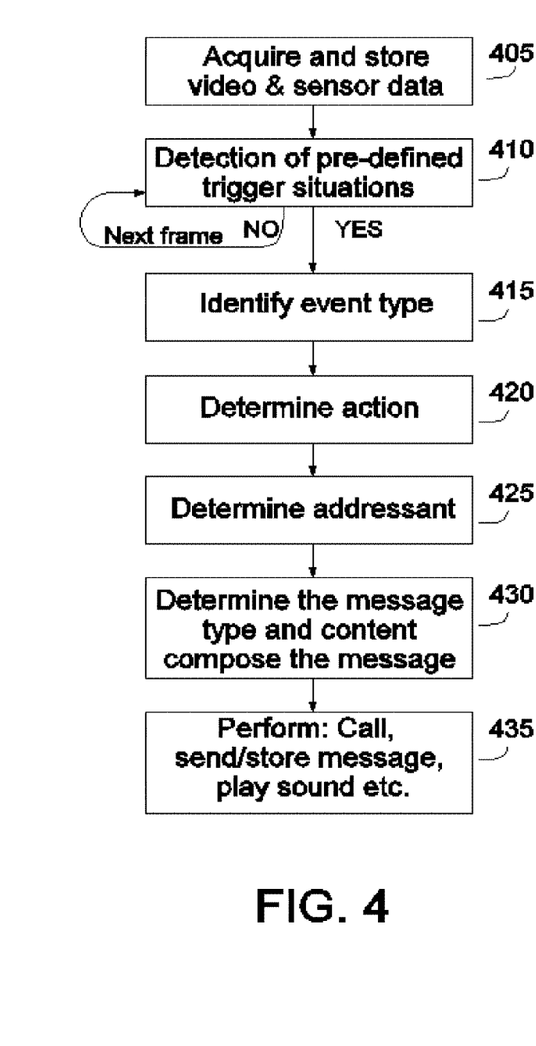
FIG. 4 is a flow chart including steps of an exemplary creation of a notifying message upon detection of a trigger event, all according to some embodiments of the present invention.

FIG. 4 is a flow chart illustrating an exemplary creation of a notifying message upon detection of a trigger event. In 405 the video and sensor data is continuously acquired and stored. Optional erasing of the remote earlier recordings is possible to release the memory if necessary. In 410 the video and sensor data is analyzed to detect the triggering event. Multiple possible trigger events can be programmed or configured during the system manufacturing, by further software and firmware updates and/or configured by user.

After the detection of the trigger event in 410, the type of trigger event is established in 415. Some of the possible examples of trigger events are calls initiated by user, medical emergency, intrusion, fire, misbehaving of the pet, etc.

The required action is determined in 420 upon a triggering event. Examples of actions can be establishing a call, which in turn can be audio call, video call or asymmetric call, where the video and or audio is transmitted only in one certain direction; creation a video summary, storing or sending the video summary; sending a notifying message etc.

In 425 the target addressee(s) are determined. Note that in some embodiments the steps can be performed in parallel, or in different order, for example 425 prior to 420.

In 430 the message type is determined, and the video message describing an event is composed, via editing and selecting the scenes and parts of the recorded video most relevant to the trigger event.

In 435 the required call is established, and/or the describing message is sent to the addressee(s) and or stored, a recorded voice message is played and/or other appropriate actions are performed by the system.

Figure 5:
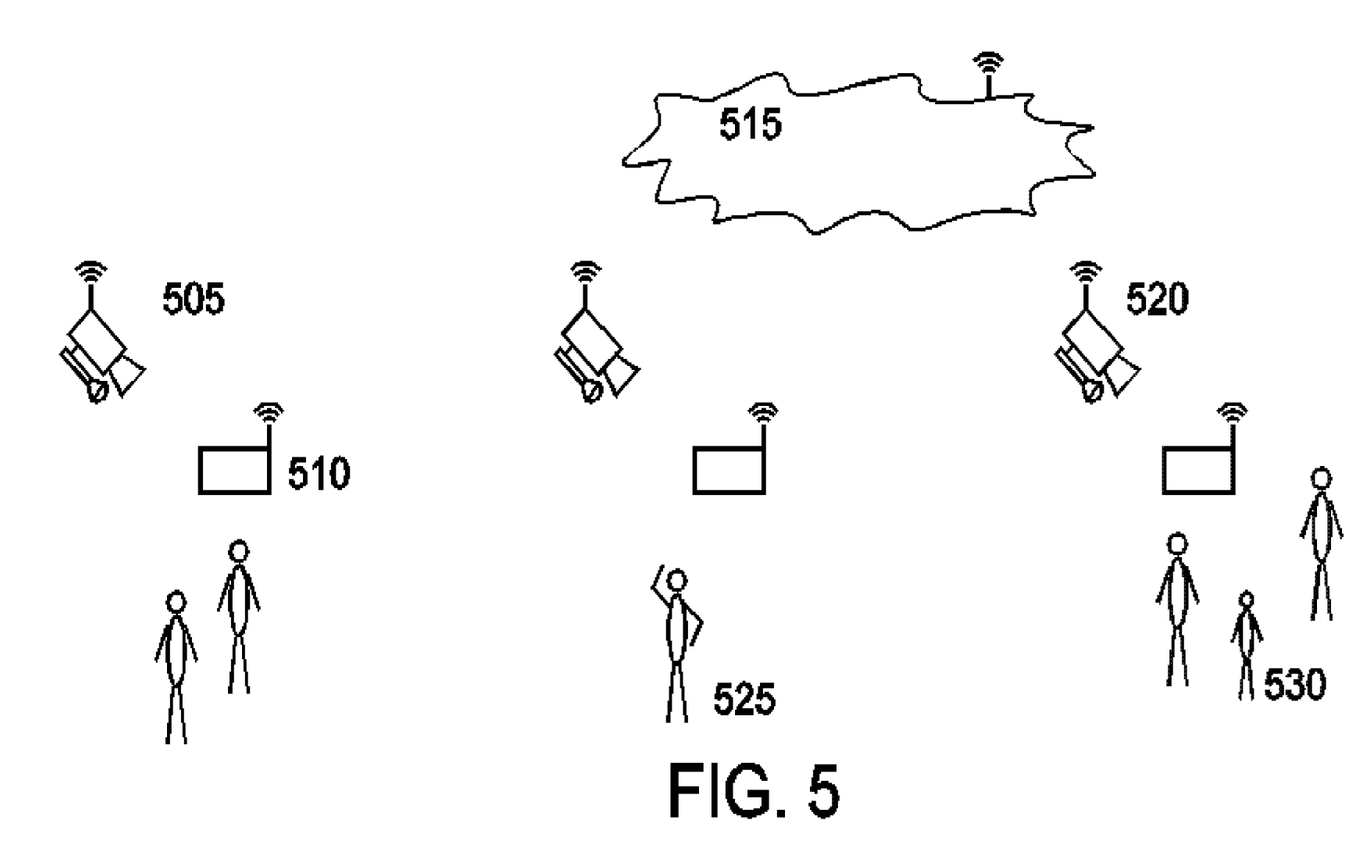
FIG. 5 is a schematic drawing of an exemplary distributed system comprising several cooperating surveillance systems, connected into a network and enabling communications of the users, all according to some embodiments of the present invention.

FIG. 5 is a schematic drawing of an exemplary distributed system comprising several cooperating surveillance systems, connected into the network and enabling communications of users. 505 and 520 are the video cameras with optional microphones and additional sensors, 510 is an optional display, as part of the system, or network connected display, which can be accessed by the system. 515 is a processing, storage and communications center, which may detect the proper addressee(s) for communication, and facilitate the communication between the users.

When the user 525 says "call Jim", his request is transmitted towards the central or distributed processing server 515, where the particular addressee "Jim" is determined, whose specific identity may depend on an identity of user 525, his address book, lists of contacts and popular contacts as well as the general situation. The search for "Jim" is performed among the users available and recognized by all the connected and cooperating systems and cameras, and then the communication channel towards Jim (530) is established.

Figure 6:
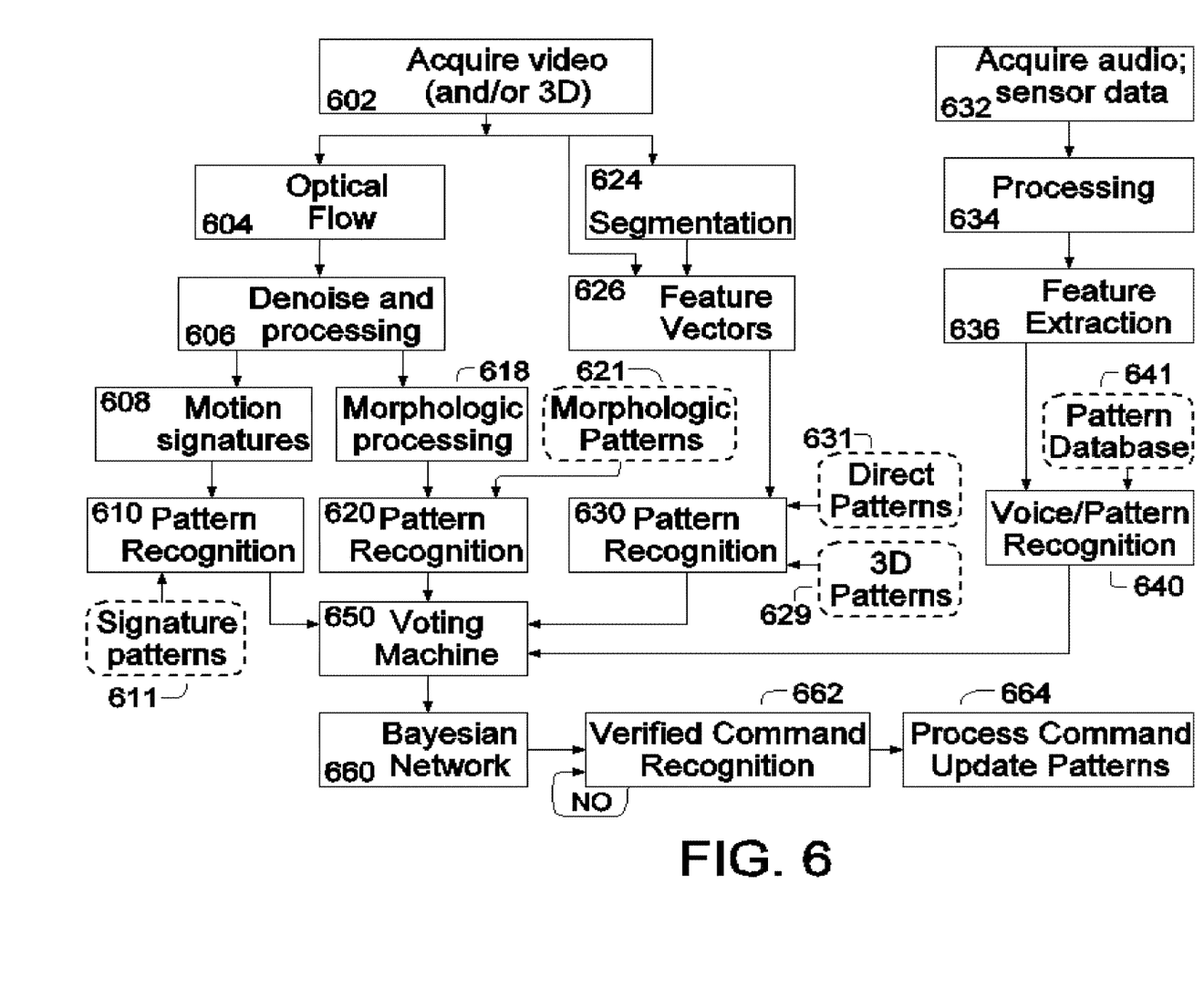
FIG. 6 is a flow chart including steps of operation of an exemplary calling camera system, according to some embodiments of the present invention.

FIG. 6 is a flow chart, illustrating the operation of an exemplary calling camera system. For the sake of brevity, some of the blocks may denote several alternative options, which will be mentioned in the explanation. The flexibility of specific embodiments allows expansion, or simplification of certain stages, which will be clarified in the explanation below.

The block 602 denotes acquisition of video, and/or 3D video, from one or several cameras. Both conventional 2D video stream and 3D video stream will be referred as video stream, and the differences in their processing will be mentioned, where necessary. There are multiple video and 3D analytics methods developed in the system.

The generic outline of the video processing and analytics can be divided into stages of PRE-PROCESSING, in blocks 604, 624, 618, 634; DENOISING—shown in block 606, however optionally present in multiple other blocks (especially 624, 618, 608), and not shown for the sake of clarity; FEATURE EXTRACTION—blocks 608, 618, 626, 636; PATTERN RECOGNITION—610, 620, 630; 640; TEMPORAL SEQUENCE RECOGNITION and HIGH LEVEL ANALYTICS—650;

Now consider the flow chart in more details. The video acquired in 602 is processed in several parallel routes:

In route 604-606 the optical flow may be calculated in 604 for further processing in later stages. The optical flow is a computer vision method of calculating and attributing the motion vector to the pixels of the video frame. The motion vectors may be calculated by finding the corresponding points on the time-separated video frames. The nature of calculating of optical flow results in many cases in the noise, non-regularities and ambiguities in the calculated optical flow. These ambiguities may be solved by several methods of de-noising and regularization in 606. The denoising applying various filtering techniques, including median, Gaussian and anisotropic filtering, bilateral filters, and other filtering techniques known in the art. Regularization is based on principles of continuity of the geometric objects, energy minimization of boundaries, and utilizes the prior knowledge of object shape and motion from previous frames and object recognition.

The processed optical flow data from block 606 may be duplicated, and split for further processing in two channels 608-610 and 618-620. In block 608 the motion signatures may be extracted. The empirical rules based on data compression and extraction of feature vectors, characterizing the body motion of the user and filtering out the motion of other objects, the rules evolved and tuned to enhance the pattern recognition performance in block 610.

The pattern recognition may be implemented as a weighted sum of alternative classifiers, which contribute into the result (weight) can be optionally set to zero. Among the trained classifiers are Support Vector Machines, Deep Learning algorithms, as well as machine learning algorithms disclosed by Blayvas et.al. in [A1], which is based on multiresolution probability density estimation of each class in the feature space. The trained engine (or engines) of pattern recognition is shown by block 611.

Another channel of analysis of optical flow may be 618-620. The processed optical flow from 606 may be delivered into block 618 for morphological analysis in the block, where the human body, pet or other object of interest is rectified from the background, based on cues of size, geometric proportions, body model and body motion model combined with additional heuristic rules. The extracted body model and its motion may contribute to the pattern recognition engine 620, (which is different from 610) trained to recognize gestures or other required patterns for that input. 621shows the engines for pattern recognition.

Another channel of processing may be direct feature extraction from the video frames in 626, without preliminary motion flow calculation. It can be done either from separate regions of the image, obtained after segmentation in 624, or directly extracted from the entire frame, without preliminary segmentation. The extracted features feed the pattern recognition engine 630. Blocks 631 'Direct Patterns' and 629 '3D Patterns' reflect the fact that all the processing channel 624-626-630 illustrates two different actual processing channels: for 2D video and for 3D video, and each of them has its own pattern recognition engine and database trained on its own samples.

Finally, the processing channel 632-634-636-640 illustrates exemplary data acquisition by microphone or other sensors (632), data processing (634), Feature extraction (636) and voice recognition (or pattern recognition for other sensors) block 640.

The independent pattern recognition engines 610, 620, 630, 640 may be programmed to recognize isolated body parts, objects and gestures. Moreover, their results are often incoherent.

The Voting Machine 650 is trained to perform a certain classification decision 'strong classification' on the basis of partial information derived by 610, 620, 630, 640—votes from the 'weak classifiers'.

The sequence of distinctive movements may be combined and verified to be a certain sequence of gestures in 660, which, according to some embodiments, may be based on Bayesian Network analysis. Block 662 illustrates exemplary system verification of the recognized gesture, which may be based on confidence values obtained from 660, user confirmation, and other clues. If the recognized gesture or user command exceeds certain confidence threshold the command may be performed by the system in block 664. At certain higher threshold level, the pattern recognition engines are also updated and trained on the new video sequence and extracted features.

One of the ways to facilitate, simplify and enhance robustness of the gesture interface both for user and for the system is to overlay the video of the user and the buttons of the interface, and to display both layers to the user (the layer of the video showing the user, and the layer of the graphic, showing the buttons of the interface) on the same screen. It may thus be easier for the user to properly direct his movements, and for the system—to properly process and recognize them. Furthermore, overlaying the gesture paths over the user video can allow the system to train the user to use the proper gestures, to illustrate the desired direction, or to provide the feedback of how the gestures were acquired and interpreted by the system.

Figure 7:
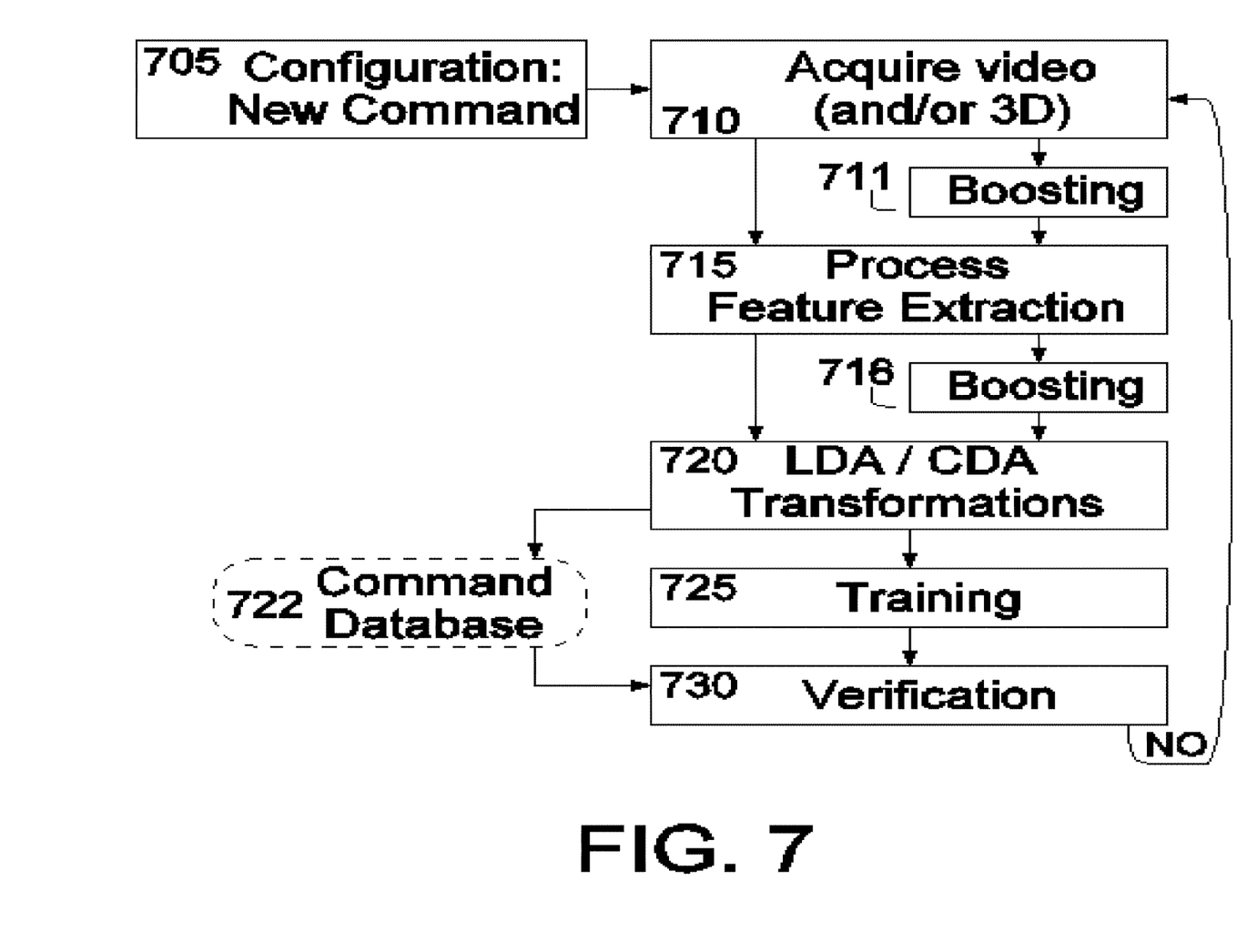
FIG. 7 is a flow chart including steps of operation of an exemplary training of an exemplary surveillance/imaging system to recognize a new command, all according to some embodiments of the present invention.

FIG. 7 is a flow chart, illustrating exemplary training of the system to recognize a new command. When a user wants to add a new command, he starts from informing selecting in the system menu, or Configuration, as illustrated by block 705. This may invoke a dedicated program for acquisition of the new command It starts from acquisition of the video, 3D, audio and/or sensor data in block 710. Boosting 711 is a technique, where the amount of training data is increased, without unnecessary burden on the user to record the same command for many times.

The methods to increase number of training data include copying of the same sequence with additional random noise, geometric and temporal distortions, change of contrast exposure, changed background (especially when the 3D information is available) other similar methods.

Video processing and feature extraction block 715 may combine two types of operations: Processing, where the video is normalized to make it invariant to irrelevant parameters, such as illumination, geometric shift, scale, and others; Feature extraction—which is the set of methods of distilling the information relevant for pattern recognition while reducing and subtracting the irrelevant information. The feature extraction methods include compression, subsampling, principal component analysis, scalar product with appropriate basis functions, dimensionality reduction and other techniques.

Block 716 denotes the boosting of extracted feature vectors, where the amount of training feature vectors is increased by adding random noise, and linear combination of the multiple feature vectors obtained by boosting in prior block 711.

The features obtained in blocks 715 and 716 may be compared versus the features of other commands, which are stored in Command Database 722. To facilitate the recognition and distinguishing of new command, and decrease or eliminate classification errors, the new feature vectors should be separated in the best possible way from other feature vectors corresponding to other commands, and simultaneously all the multitude of the new feature vectors obtained in several training sequences, or by boosting (711, 716) should lie as compact as possible in the feature space. The feature space transformation, performed by techniques of Linear Discriminant Analysis (LDA), Canonical Discriminant Analysis (CDA) and other transformations of the feature space enhancing the inter-class separation and reducing the within-class scatter may be performed in 720.

Finally, after training the classifier in 725, which is based on multiresolution probability density estimation [A4], and deep learning algorithms, the performance verification may be performed in 730, based on the Command Database 722. In case of classification errors, the user may be notified and request to repeat the training.

According to some embodiments, there may be provided a communication device comprising one or more of:
a. a video camera to acquire visual information from a scene and to convert the visual information into a video stream;
b. video processing circuits to: (a) receive the video stream, (b) extract user related features from the video stream; and (c) detect and characterize one or more user actions;
c. a controller to receive one or more outputs of the video processing circuit and, responsive to an indication of one or more detected events within the video stream, trigger a communication session between said communication device and an addressee device, wherein different addressee devices are associated with different detected actions;
d. a microphone;
e. audio processing circuits for characterizing acoustic information collected by said microphone;
f. user specific addressee contacts data storage to contain user specific records, which records correlate specific detected actions or specific detected utterances of a specific user with identifiers of one or more specific addressee devices; and
g. one or more three dimensional sensors.

According to some embodiments of the embodiments mentioned in par. [00107] above:
a. said controller may select an addressee device at least partially based on an output of the audio processing circuit;
b. said audio processing circuit or said video processing circuits may include user identification functionality to identify specific humans;
c. said contacts data storage may include multiple device identifiers for a given addressee and an indication of a preferred order of devices to use in attempting a communication session with the given addressee;
d. said controller, upon receiving an indication of a user action or user utterances associated with the given addressee, may attempt a communication session with the given addressee in accordance with the preferred order of addressee devices;

e. if a communication attempt by said controller with a first device in the order fails, the controller may attempt a communication session with a second addressee device in the order;

f. the first addressee device may be of a different type from, and utilize different communication channels than, the second addressee device; and g. an output of the one or more three dimensional sensors may be used by the device to: (a) extract user related features from the video stream; and (b) detect and characterize one or more user actions.

According to some embodiments, there may be provided a communication device comprising one or more of:

a. an audio-video acquisition assembly including: (a) a camera to acquire visual information from a scene and to convert the visual information into a video stream, and (b) a microphone to acquire acoustic signals from the scene and to convert the acoustic signals into an audio stream;

b. audio-video processing circuits to: (a) extract user related features from the video stream; (b) detect and characterize one or more user actions; and (c) characterize information within the audio stream;

c. a controller to receive outputs of said audio-video processing circuits and, responsive to a detection of an event in the received outputs, trigger a communication session between said communication device and an addressee device, wherein different addressee devices are associated with different combinations of detected actions and utterances, such that uttered subjective addressee designations are resolved by said device prior to communication session initiation; and d. one or more three dimensional sensors to generate signals indicative of user movements or gestures;

According to some embodiments of the embodiments f mentioned in par. [00109] above:

a. a subjective addressee designation by a user may be resolved using a user specific contacts data storage holding user specific records, which records correlate detected actions or utterances of a specific user with an identifier of a specific addressee device; and b. output from said one or more three dimensional sensors may be processed to detect an action of a user or an event occurring to a user.

According to some embodiments, there may be provided a communication device comprising one or more of:

a. an audio-video acquisition assembly including: (a) a camera to acquire visual information from a scene and to convert the visual information into a video stream, and (b) a microphone to acquire acoustic signals from the scene and to convert the acoustic signals into an audio stream;

b. a data buffer to store at least a portion of the audio or video streams;

c. audio-video processing circuits to:
(a) extract user related features from the video stream;
(b) detect and characterize one or more user actions within the video stream; and
(c) characterize information within the audio stream;

d. a controller to receive outputs of said audio-video processing circuits and, responsive to an identification of an event of a specific event type, trigger a communication session between said communication device and an addressee device, wherein the communication session includes an auto generated audio-video synopsis relating to the event and based on data stored in the data buffer;

e. a detected event specific contacts data storage, containing event specific records, which event specific records correlate detected event types or detected utterances of a specific user with an identifier of a specific addressee device; and f. a content auto-generator which may automatically generate an audio-video synopsis based on event specific contact data-storage records relating to auto-generating an audio video synopsis for at least one event type.

According to some embodiments of the embodiments mentioned in par. [00111] above:

a. said triggering event type may be selected from the group consisting of: (a) a fall, (b) a stumble, (c) a distress gesture, (d) presence of an unknown person in the scene, (e) loud noise, (f) user speech at an elevated volume, and (g) stalled or stopped breathing;

b. synopsis auto-generation instructions for a specific detected event type may include instructions to identify within the buffered audio or video streams specific portions including specific features, specific actions or specific events relevant to an understanding of the detected event type; and to append the identified portions to the synopsis;

c. said device may be adapted to concurrently transmit to the addressee device the autogenerated synopsis and a live audio-video feed of the scene; and d. said device may establish a bidirectional communication session with the addressee device.

It should also be understood by one of skill in the art that some of the functions described as being performed by a specific component of the system may be performed by a different component of the system in other embodiments of this invention.

The present invention can be practiced by employing conventional tools, methodology and components. Accordingly, the details of any such tool, component and methodology are not set forth herein in detail. In the previous descriptions, numerous specific details are set forth, in order to provide a thorough understanding of the present invention. However, it should be recognized that the present invention may be practiced without resorting to the details specifically set forth.

In the description and claims of embodiments of the present invention, each of the words, "comprise" "include" and "have", and forms thereof, are not necessarily limited to members in a list with which the words may be associated.

Only exemplary embodiments of the present invention and but a few examples of its versatility are shown and described in the present disclosure. It is to be understood that the present invention is capable of use in various other combinations and environments and is capable of changes or modifications within the scope of the inventive concept as expressed herein.

According to embodiment a device may include a display and an interface generator adapted to render control elements on said display. Control elements may be rendered buttons such as "new message", "call", "send", etc. The device's controller may be adapted to use outputs of the video processing circuit to allow a user to interact with rendered control elements using physical movements and/or gestures.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed is:

1. A communication device comprising:
a video camera to acquire visual information from a scene and to convert the visual information into a video stream;
a video processing circuit configured to:
(a) receive the video stream,
(b) extract user related features from the video stream;
(c) detect and characterize, based on the extracted features, one or more user clue actions that comprise clues to an event occurring in the scene;
(d) identify at least one of the clue actions as an event triggering action, in case a feature of at least one of the clue actions pass a certain determined threshold;
(e) in case a triggering action is identified, determine that a corresponding event is occurring in the scene; and
(f) once the occurring of the event is determined, update thresholds related to previous clue actions identified before the triggering action, to retroactively identify at least some of the previous clue actions as triggering actions;
wherein the video processing circuit includes user identification functionality to identify specific participants;
a controller configured to:
receive one or more outputs of the video processing circuit; and
responsive to a detection of one or more events within the video stream, trigger a communication session between said communication device and an addressee device according to predetermined rules, wherein the addressee device is selected by the controller according to a type of the detected one or more events or the identity of specific participants,
wherein different addressee devices are associated with different detected actions and different detected events; and
wherein said predetermined rules relate to said one or more detected events within the video stream.

2. The device according to claim 1, further comprising:
a microphone; and
an audio processing circuit for characterizing acoustic information collected by said microphone;
wherein said controller selects an addressee device at least partially based on an output of the audio processing circuit.

3. The device according to claim 2, further comprising a user specific addressee contacts data storage to contain user specific records, which records correlate specific detected actions or specific detected utterances of a specific user with identifiers of one or more specific addressee devices.

4. The device according to claim 3, wherein said contacts data storage includes multiple device identifiers for a given addressee and an indication of a preferred order of devices to use in attempting a communication session with the given addressee.

5. The device according to claim 4, wherein said controller, upon receiving an indication of a user action or user utterances associated with the given addressee, attempts a communication session with the given addressee in accordance with the preferred order of addressee devices.

6. The device according to claim 5, wherein, if a communication attempt by said controller with a first device in the order fails, the controller attempts a communication session with a second addressee device in the order.

7. The device according to claim 6, wherein the first addressee device is of a different type from and utilizes different communication channels than the second addressee device.

8. The device according to claim 1, further comprising one or more three dimensional sensors, wherein an output of the one or more three dimensional sensors is used by said device to:
(a) extract user related features from the video stream; and
(b) detect and characterize one or more user actions.

9. The device according to claim 1, further comprising a display and an interface generator adapted to render control elements on said display, and wherein said controller is adapted to use outputs of the video processing circuit to allow a user to interact with rendered control elements using physical movements and/or gestures.

10. The device according to claim 1, wherein said controller sends a summary video message upon a trigger event or at a predefined time.

11. A communication device comprising:
an audio-video acquisition assembly including:
(a) a camera to acquire visual information from a scene and to convert the visual information into a video stream, and
(b) a microphone to acquire acoustic signals from the scene and to convert the acoustic signals into an audio stream;
audio-video processing circuits configured to:
(a) extract user related features from the video and audio streams;
(b) detect and characterize, based on the extracted features, one or more user clue actions that comprise clues to an event occurring in the scene;
(c) identify at least one of the clue actions as an event triggering action, in case a feature of this at least one of the clue actions pass a certain determined threshold;
(d) in case a triggering action is identified, determine that a corresponding event is occurring in the scene; and
(e) once the occurring of the event is determined, update thresholds related to previous clue actions identified before the triggering action, to retroactively identify at least some of the previous clue actions as triggering actions;
wherein the video processing circuit include user identification functionality to identify specific participants;
a controller configured to receive outputs of said audio-video processing circuits and responsive to a detection of an event in the received outputs, trigger a communication session between said communication device and an addressee device according to predetermined rules, wherein the addressee device is selected by the controller according to a type of the detected event or the identity of the participant,
wherein different addressee devices are associated with different combinations of detected actions, detected events and utterances, such that uttered subjective addressee designations are resolved by said device prior to communication session initiation; and
wherein said predefined rules relate to said detected events.

12. The device according to claim 11, wherein a subjective addressee designation by a user is resolved using a user specific contacts data storage holding user specific records, which records correlate detected actions or utterances of a specific user with an identifier of a specific addressee device.

13. The device according to claim 11, further comprising one or more three dimensional sensors to generate signals indicative of user movements or gestures.

14. The device according to claim 13, wherein output from said one or more three dimensional sensors is processed to detect an action of a user or an event occurring to a user.

15. A communication device comprising:
an audio-video acquisition assembly including:
  (a) a camera to acquire visual information from a scene and to convert the visual information into a video stream, and
  (b) a microphone to acquire acoustic signals from the scene and to convert the acoustic signals into an audio stream;
a data buffer to store at least a portion of the audio or video streams;
audio-video processing circuits configured to:
  (a) extract user related features from the video and audio streams;
  (b) detect and characterize, based on the extracted features, one or more user clue actions that comprise clues to an event occurring in the scene;
  (c) identify at least one of the clue actions as an event triggering action, in case a feature of this at least one of the clue actions pass a certain determined threshold;
  (d) in case a triggering action is identified, determine that a corresponding event is occurring in the scene; and
  (e) once the occurring of the event is determined, update thresholds related to previous clue actions identified before the triggering action, to retroactively identify at least some of the previous clue actions as triggering actions;
wherein the video processing circuit include user identification functionality to identify specific participants;
a controller configured to receive outputs of said audio-video processing circuits and responsive to a detection of an event of a specific event type, trigger a communication session between said communication device and an addressee device according to predetermined rules, wherein the addressee device is selected by the controller according to a type of the detected event or the identity of the participant,
wherein the communication session includes an auto generated audio-video synopsis relating to the event and based on data stored in the data buffer, the synopsis comprises triggering actions and the clue actions retroactively identified as triggering; and
wherein said predetermined rules relate to said identification of an event type.

16. The device according to claim 15, further comprising a detected event specific contacts data storage, containing event specific records, which event specific records correlate detected event types or detected utterances of a specific user with an identifier of a specific addressee device.

17. The device according to claim 16, wherein said triggering action or clue action is selected from the group consisting of:
  (a) a fall,
  (b) a stumble,
  (c) a distress gesture,
  (d) presence of an unknown person in the scene,
  (e) loud noise,
  (f) user speech at lowered volume and/or clarity,
  (g) stalled or stopped breathing,
  (h) presence of an animal,
  (i) a theft, and
  (j) face recognition.

18. The device according to claim 16, further comprising a content auto-generator and wherein said event specific contact data-storage records provide to said auto-generator instructions relating to auto-generating an audio-video synopsis for at least one event type.

19. The device according to claim 18, wherein synopsis auto-generation instructions for a specific detected event type include instructions to identify within the buffered audio or video streams specific portions including specific features, specific actions or specific events relevant to an understanding of the detected event type; and to append the identified portions to the synopsis.

20. The device according to claim 15, wherein said device is adapted to concurrently transmit to the addressee device the auto-generated synopsis and a live audio-video feed of the scene.

21. The device according to claim 15, wherein said device establishes a bidirectional communication session with the addressee device.

* * * * *